Figure 1:
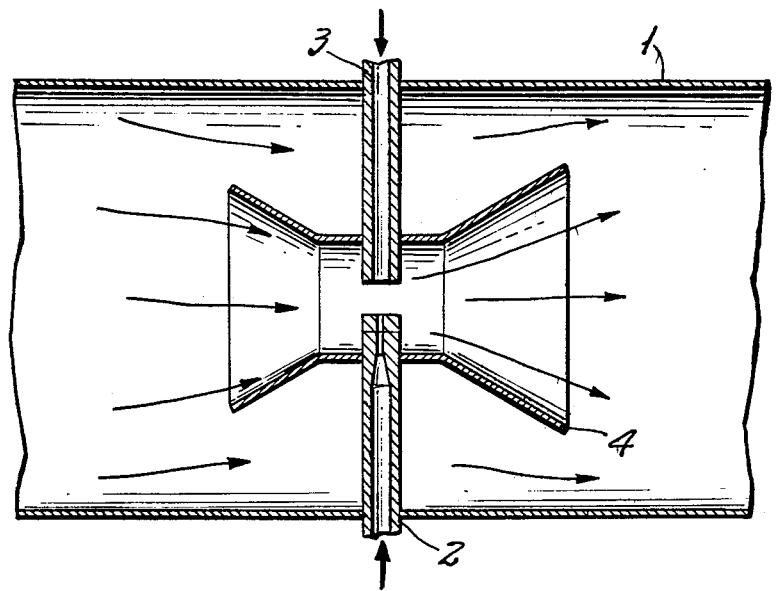

United States Patent [19]

Glindsjö

[11] Patent Number: 4,483,805
[45] Date of Patent: Nov. 20, 1984

[54] PROCESS FOR INJECTION OF FLUID, E.G. SLURRY IN E.G. FLUE GASES AND A NOZZLE DEVICE FOR THE ACCOMPLISHMENT OF THE PROCESS

[75] Inventor: Per Glindsjö, Växjö, Sweden
[73] Assignee: ADL-Innovation KB, Växjö, Sweden
[21] Appl. No.: 502,164
[22] Filed: Jun. 8, 1983

[30] Foreign Application Priority Data
Jun. 9, 1982 [SE] Sweden ................................ 8203568

[51] Int. Cl.³ .............................................. F16K 19/00
[52] U.S. Cl. .................................. 261/78 A; 137/889; 137/896; 261/117; 261/DIG. 9; 261/DIG. 39
[58] Field of Search ............... 137/896, 897, 898, 889, 137/602; 261/78 A, 117, DIG. 9, DIG. 39

[56] References Cited

U.S. PATENT DOCUMENTS

| | | | |
|---|---|---|---|
| 2,746,802 | 5/1956 | Feis | 261/DIG. 39 |
| 3,495,384 | 2/1970 | Alliger | 261/DIG. 9 |
| 3,727,640 | 4/1973 | Sargeant | 137/889 |
| 4,422,423 | 12/1983 | Sugiyama | 261/DIG. 39 |

FOREIGN PATENT DOCUMENTS 18280 of 1896 United Kingdom ................ 261/117

Primary Examiner—Robert G. Nilson

[57] ABSTRACT

This invention relates to a process for injection of fluid e.g. slurry into e.g. flue gases, and a nozzle device for the accomplishment of the process. The process according to the invention is characterized in that a thin stream of fluid e.g. slurry is injected into a wider stream of gas to form disintegrated drops, at which the fluid stream is peeled off on its way into the gas stream, the fluid stream is made to turn 180° and accelerate against a solid body, where another disintegration of the drops occurs very rapid and the nozzle device according to the invention is characterized in that it (4) is arranged with two intakes (2 and 3) coming into the nozzle opposite to each other, perpendicular to the passage of the flue gas through a flue gas pipe (1) at which slurry is injected through the intake (2), which is formed as a wider pipe (2), which ends in a wearing part (5), in which a finer pipe (2') is arranged and at which compressed air or steam is injected through the intake (3) arranged as a pipe (3'), besides which the finer pipe (2') for slurry is centered in relation to the pipe (3') so that a thin stream of slurry is arranged to be injected at a high speed into a wider stream of compressed air or steam to form fine slurry drops, which are arranged to be spread by the flue gas through the nozzle device.

2 Claims, 2 Drawing Figures

PROCESS FOR INJECTION OF FLUID, E.G. SLURRY IN E.G. FLUE GASES AND A NOZZLE DEVICE FOR THE ACCOMPLISHMENT OF THE PROCESS

This invention relates to a process for injection of fluid e.g. slurry in e.g. flue gases and a nozzle device for the accomplishment of the process.

By flue gas cleaning, especially by cleaning of flue gas from sulphuric gases like $SO_2$ and $SO_3$, basic substances are often injected, e.g. $CaO$, $Na_2CO_3$ or $MgO$ in the flue gas.

To reach an acceptable reaction of these substances with the sulphuric flue gases, this should be done together with water in the state of a slurry. The reaction with $SO_2$, which is the main part of the sulphuric substances, is easier accomplished when the flue gas temperature is lowered and gets close to the dew point of the flue gas. Before the slurry comes out into the flue gas, it should, however, be disintegrated as much as possible, so that (a) the reactive surface, which is exposed to the flue gas, gets as large as possible and (b) the slurry manages to evaporate before it reaches the following dust collector.

To obtain the above mentioned disintegration, another medium, e.g. steam or compressed air, is caused to act upon the injected slurry in a special nozzle device according to the invention. This device is characterized by the claims submitted herewith. This general idea itself is already known, but the nozzle device according to the invention shows a simple way of accomplishing this result, which makes it easier to use this technique also for small coal- and oilfired boilers.

Figure 2:
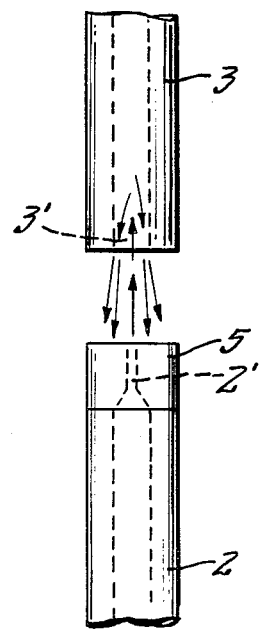

The invention will now be further described with reference to the drawing enclosed, where FIG. 1 shows a cross section of the device seen from the side and FIG. 2 shows a view of intakes 2 and 3 illustrating the manner in which the streams of slurry and steam or compressed air are mixed in the nozzle.

FIG. 1 shows a flue gas duct 1, in which a particle distributor or a nozzle device 4 is placed. To the nozzle are connected (a) an intake 2 of basic slurry, preferably slaked lime and/or fly-ash suspended and/or dissolved in water and (b) an intake 3 of compressed air or steam. The principle is, that the slurry is injected as a thin stream into a wider stream of e.g. compressed air, after which the fine drops obtained from the slurry are prevented from agglomerating into bigger drops, when the flue gas is spreading these at the passage through the nozzle 4. The forming of the fine drops of slurry is best shown in FIG. 2. The slurry comes in through intake 2, after which it comes into a wear-resistant part 5 of e.g. ceramic or hard metal. In the wear-resistant part there is a smaller opening 2', in which the slurry is accelerated to a high speed. The wear-resistant part 5 is used, since lime stone slurry and fly-ash, which also can be mixed in the slurry, is very abrasive. The slurry opening 2' is centred in relation to an opening of the compressed air pipe 3', at which the slurry and compressed air meet at very high relative speeds. The slurry stream is then "peeled off" on its way into the compressed air stream, after which the slurry drops, now formed, make a 180° turn and accelerate against the sheet created by said air stream, which is in the front of the wear-resistant part 5. The slurry drops hit this sheet at a high speed, after which another disintegration of the drops occurs explosively.

The invention is of course not restricted to this design but can be varied within the scope of the invention.

I claim:

1. Apparatus for injecting a slurry into a moving stream of flue gas to remove constituents therefrom, comprising a flue gas duct, a nozzle disposed concentrically within said duct and having one open end for receiving said flue gas, another open end for discharging the same therefrom, and a central throat disposed between said open ends, first and second diametrically opposed ducts connected respectively to the throat of said nozzle and provided with openings opposed to one another, said first duct having a larger opening than said second one for conducting a pressurized gaseous medium to said throat and said second duct having a smaller opening for conducting said slurry to said throat in opposition to said first opening, said second duct being provided at the end thereof terminating at said throat with a wear-resistant material, whereby a thin stream of slurry may be injected into said nozzle at high speed against an opposed stream of a pressurized gaseous medium to form fine slurry drops which are further dispersed by the flue gas passing through said nozzle.

2. Apparatus according to claim 1, wherein said nozzle comprises a central cylindrically shaped throat through which said first and second ducts project, and frusto-conical inlet and outlet ducts, one converging on said throat on the inlet side and the others diverging from said throat on the outlet side, said duct being connected to said throat for receiving and discharging said glue gas together with said dispersed slurry.

* * * * *